Figure 1:
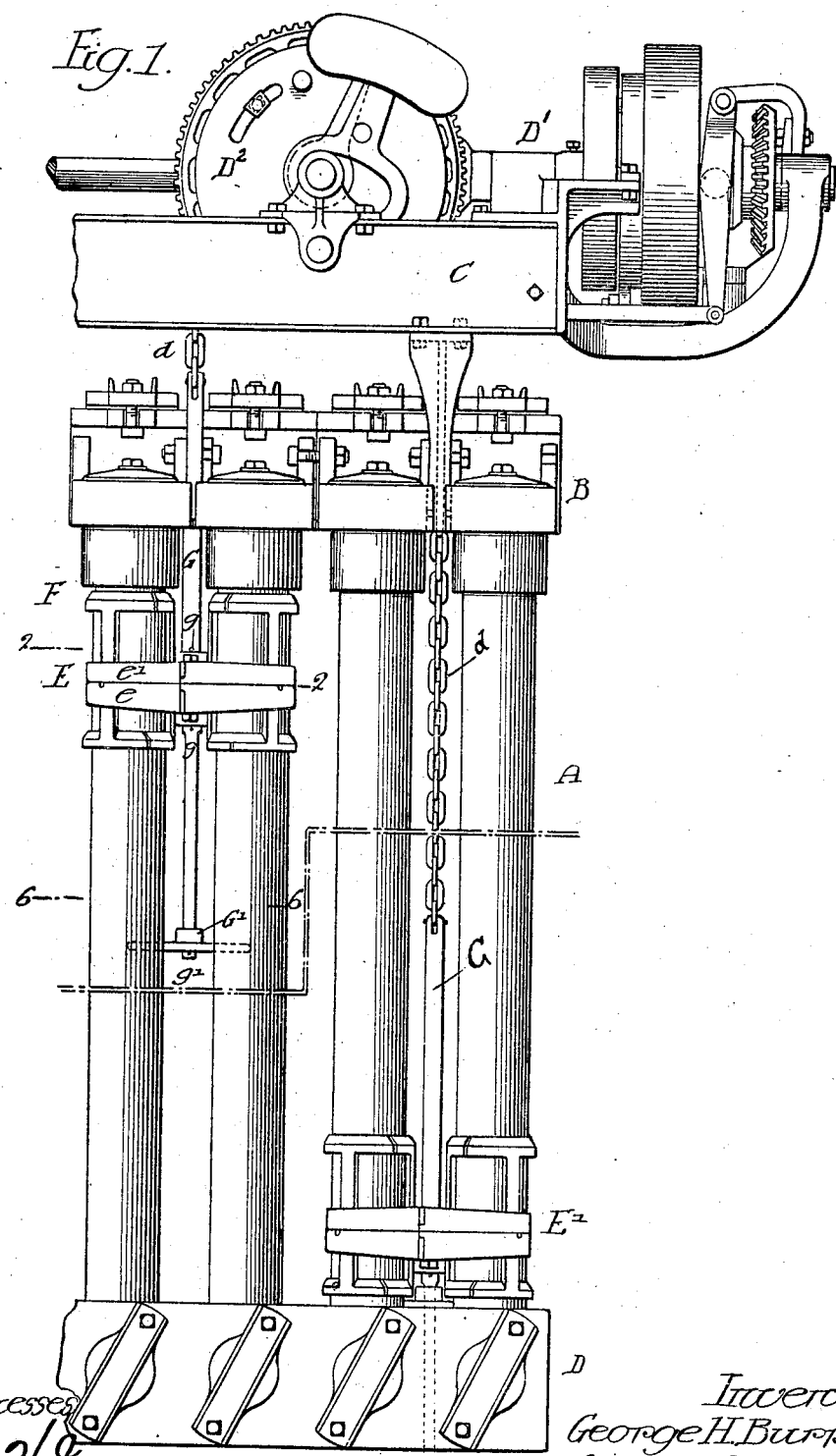

No. 828,189. PATENTED AUG. 7, 1906.
G. H. BURPEE.
TUBE SCRAPER.
APPLICATION FILED MAY 1, 1905.

2 SHEETS—SHEET 1.

Witnesses
Inventor
George H. Burpee.
by his Attorneys

No. 828,189. PATENTED AUG. 7, 1906.
G. H. BURPEE.
TUBE SCRAPER.
APPLICATION FILED MAY 1, 1905.
2 SHEETS—SHEET 2.
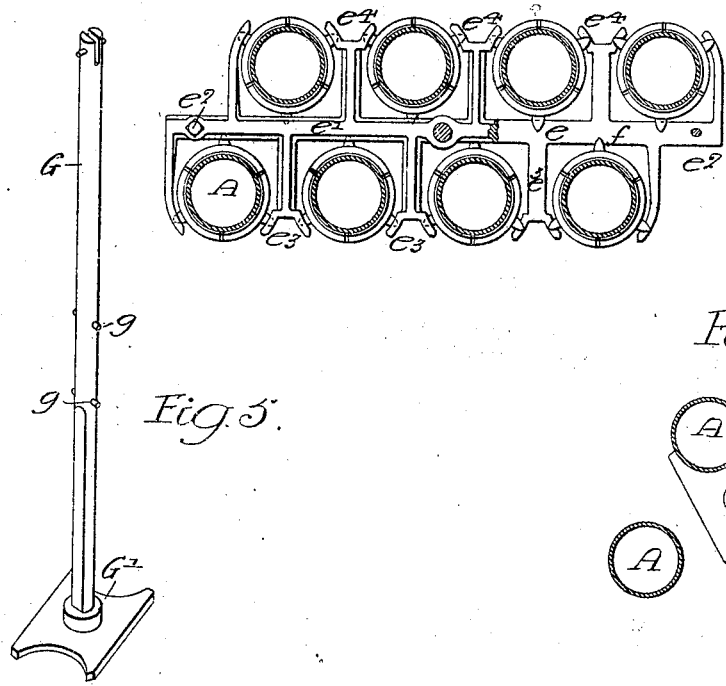
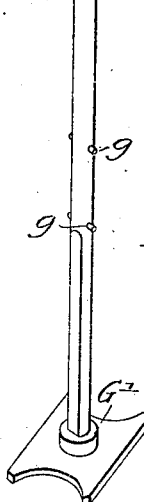
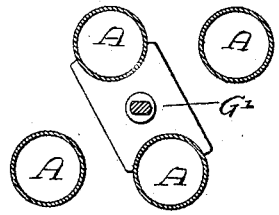
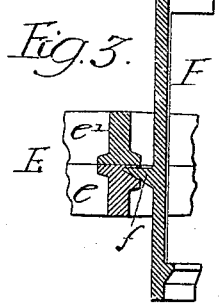
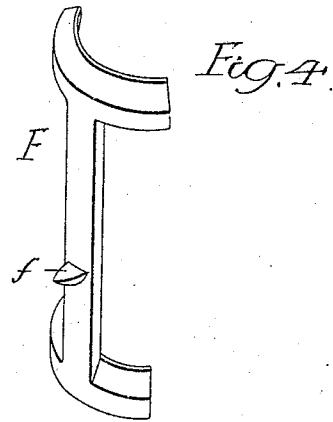
Witnesses:
Augustus B. Coppes
Titus N. Rod
Inventor
George H. Burpee
by his Attorneys
Howard & Howard

UNITED STATES PATENT OFFICE.

GEORGE H. BURPEE, OF PHILADELPHIA, PENNSYLVANIA, ASSIGNOR TO B. F. STURTEVANT COMPANY, OF HYDE PARK, MASSACHUSETTS, A CORPORATION OF MASSACHUSETTS.

TUBE-SCRAPER.

No. 828,189.   Specification of Letters Patent.   Patented Aug. 7, 1906.

Application filed May 1, 1905. Serial No. 258,264.

*To all whom it may concern:*

Be it known that I, GEORGE H. BURPEE, a citizen of the United States, residing in Philadelphia, Pennsylvania, have invented certain Improvements in Tube-Scrapers, of which the following is a specification.

My invention consists in certain improvements in the scrapers used for removing soot from the surfaces of the circulating-tubes of a feed-water heater or fuel-economizer.

The object of my invention is to improve the construction of the scrapers and to properly guide them as they are reciprocated in contact with the tubes.

In the accompanying drawings, Figure 1 is a side view of sufficient of a fuel-economizer to illustrate my invention. Fig. 2 is a sectional plan view on the line 2 2, Fig. 1. Fig. 3 is an enlarged sectional view of one of the scrapers and the frame. Fig. 4 is a perspective view of one of the scrapers. Fig. 5 is a perspective view of the guide; and Fig. 6 is a sectional plan view on the line 6 6, Fig. 1.

A A are the tubes of the fuel-economizer, B and D are the upper and lower headers, respectively, of the said economizer, and C is a supporting-frame carrying the mechanism D' for reciprocating the scrapers. This particular mechanism is fully shown and claimed in a patent granted to me, No. 733,141, dated July 7, 1903, and the particular form of economizer is also shown in a patent, No. 729,273, granted to me May 26, 1903.

E E' are the frames supporting the scrapers F, and they are hung from rods G, passing through suitable openings in them and attached to the ends of a chain $d$, passing around the chain-wheel $D^2$ of the operating mechanism D'. Said rods G are held to their respective frames by pins $g$ $g$, the upper end of each rod being attached to one end of the chain $d$. Sliding on the lower portion of the rod is a bearing-plate G', Fig. 5, which is made in the manner shown so as to be guided by two adjoining tubes A, Fig. 6. This plate G' is arranged so that the bar G can slide through it, and a pin $g'$ is provided to prevent said plate being detached from said bar.

When either of the frames E or E' is at its lowest position, as shown in Fig. 1, the guide-plate G' simply rests upon the lower header D while the rod G passes down through the plate. On the upward movement of the frame the rod passes through the plate until the pin $g'$ strikes it, when said rod carries said plate with it, thereby causing the latter to act at all times as a guide for the rod G. The scraper-frames are made in two parts $e$ $e'$, secured together by bolts $e^2$.

The tubes A are staggered, as shown in Fig. 2, one set of tubes being opposite the spaces between the other set of tubes.

On the lower section E of the frame $e$ are arms $e^3$, which extend between adjoining tubes. These arms are forked at their outer ends, and in each fork is a recess for the reception of a lug $f$, projecting from one section of the segmental scraper F, there being also a recess for one of said scraper-lugs in the bar $e$, adjacent to each of the tubes. There are in the present instance three scrapers for each tube, and these are shaped, as shown in Figs. 3 and 4, so that both the upper and lower portions of each scraper bear upon the surface thereof.

Alternating with the arms $e^3$ and projecting from the opposite side of the scraper-frames are arms $e^4$, also forked and recessed for the reception of the lugs $f$ on the scrapers F.

The section $e'$ of the scraper-frame E is shaped like the lower section $e$, so that when it is placed above the latter and secured thereto it will hold the several scrapers in position, while allowing them sufficient freedom to permit them to accommodate themselves to the tubes. By this construction I am enabled to make a very strong and substantial frame for the scrapers and at the same time provide means for steadying the bar to which the scrapers are attached.

I claim as my invention—

1. In a tube-scraper, the combination of a frame, a scraper or scrapers carried thereby, a rod attached to the frame, means connected to the rod for reciprocating said frame, and means on said rod constructed to engage the tubes for guiding the frame, said means being movable relatively to said rod, substantially as described.

2. In a tube-scraper, the combination of a frame, a scraper or scrapers carried thereby, a rod attached to the frame having a guide constructed to engage the tubes and provided with means whereby its motion is limited, with means connected to said rod for reciprocating the frame, the rod being movable relatively to its guide, substantially as described.

3. In a tube-scraper, the combination of a frame, a scraper or scrapers carried thereby, a rod passing through the frame, and a guide-plate on the rod below the frame constructed to engage the tubes, said plate being movable relatively to the rod, substantially as described.

In testimony whereof I have signed my name to this specification in the presence of two subscribing witnesses.

GEORGE H. BURPEE.

Witnesses:
  WALTER CHISM,
  JOS. H. KLEIN.